(12) United States Patent
Yamaguchi et al.

(10) Patent No.: US 6,734,255 B1
(45) Date of Patent: May 11, 2004

(54) GRAFT POLYMER, PROCESS FOR THE PRODUCTION THEREOF AND SOLUTION-TYPE WATER-AND OIL-REPELLENT COMPOSITIONS CONTAINING THE POLYMER

(75) Inventors: Fumihiko Yamaguchi, Settsu (JP); Makoto Hanazawa, Settsu (JP); Kazunori Hayashi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/070,978

(22) PCT Filed: Sep. 6, 2000

(86) PCT No.: PCT/JP00/06047

§ 371 (c)(1),
(2), (4) Date: Mar. 13, 2002

(87) PCT Pub. No.: WO01/19884

PCT Pub. Date: Mar. 22, 2001

(30) Foreign Application Priority Data

Sep. 14, 1999 (JP) .............................. 11-260186

(51) Int. Cl.$^7$ .............................. C08L 75/16; C08I 51/08
(52) U.S. Cl. .................... 525/276; 525/329.4; 525/509; 525/412; 525/443
(58) Field of Search .............................. 525/276, 329.4, 525/509, 412, 443

(56) References Cited

U.S. PATENT DOCUMENTS 3,632,391 A * 1/1972 Whitfield .................... 428/378
5,180,766 A * 1/1993 Hayama et al. ............. 524/315

FOREIGN PATENT DOCUMENTS

| EP | 0 682 146 A1 | 1/1994 |
|---|---|---|
| JP | 61-50082 | 11/1986 |
| JP | 6-199937 | 7/1994 |
| JP | 6-228534 | 8/1994 |
| JP | 8-176504 | 7/1996 |
| JP | 8-231656 | 9/1996 |
| JP | 9-95516 | 4/1997 |
| JP | 9-118876 | 5/1997 |
| JP | 10-292020 | 11/1998 |
| JP | 11-106457 | 4/1999 |
| JP | 2000-19355 | 4/2000 |
| JP | 2000-103824 | 4/2000 |
| JP | 2000-119354 | 4/2000 |
| JP | 2000-144117 | 5/2000 |

OTHER PUBLICATIONS

International Search Report.
International Preliminary Examination Report for PCT/JP00/06047 dated Dec. 7, 2001.

* cited by examiner

Primary Examiner—James J. Seidleck
Assistant Examiner—Olga Asinovsky
(74) Attorney, Agent, or Firm—Sughrue Mion, PLLC

(57) ABSTRACT

A graft polymer, which is obtained by grafting a branch polymer having a fluoroalkyl group onto a trunk polymer through a linkage having a —C(=O)NH— group, gives a solvent-based water- and oil-repellent composition having high water- and oil-repellency, high product stability and high dilution stability.

6 Claims, No Drawings

GRAFT POLYMER, PROCESS FOR THE PRODUCTION THEREOF AND SOLUTION-TYPE WATER-AND OIL-REPELLENT COMPOSITIONS CONTAINING THE POLYMER

FIELD OF THE INVENTION

The present invention relates to a graft polymer, a process for preparing the same, and a solvent-based water- and oil-repellent composition comprising the same.

RELATED ART

In view of regulation of fluorocarbons and environmental problems, solvents for water- and oil-repellent products, for example, halogen solvents such as R113 are being replaced by petroleum solvents. However, problems such as solidification or deposition of products at low temperature arise even if the solvent is merely replaced. When the water- and oil-repellent product is diluted-with the petroleum solvent having low solubility such as solvent having a small content of an aromatic compound, problems such as deposition or concentration distribution arise.

When the fluorine concentration in an active component of the water- and oil-repellent agent is reduced to impart high product stability and high dilution stability to the water- and oil-repellent composition, the water- and oil-repellency is lowered.

Japanese Patent Kokoku Publication No. 50082/1986 discloses a water- and oil-repellent comprising a graft copolymer obtained by the graft copolymerization which utilizes the reactivity of an OH group. However, the graft copolymer is insufficient in water repellency because a hydroxyl group is remained in the polymer.

Japanese Patent Kokai Publication No. 228534/1994 discloses a water- and oil-repellent comprising a fluorine-containing graft copolymer. However, the fluorine-containing graft copolymer is insufficient in solubility in the petroleum solvent because its trunk polymer is a fluorine-containing polymer.

SUMMARY OF THE INVENTION

An object of the present invention is to give a graft copolymer which has high water- and oil-repellency regardless of a small fluorine content, and also has both a solubility in a petroleum solvent and a repellency effect.

The present inventors have discovered that a graft polymer, wherein a branch polymer is a fluorine-containing polymer and a trunk polymer contains, a fluorine-free (hydrocarbon) polymer as a main component, has high water-repellency and good solubility in a petroleum solvent.

The present invention provides a graft copolymer wherein a branch polymer having a fluoroalkyl group is bonded to a trunk polymer through a linkage having a —C(=O)NH— group.

The present invention also provides a solvent-based water- and oil-repellent composition comprising the graft copolymer.

The graft polymer of the present invention is a graft polymer wherein a branch polymer is grafted at an isocyanate group moiety of a trunk polymer.

The trunk polymer has a repeating unit derived from an isocyanate group-containing vinyl monomer and a repeating unit derived from the other copolymerizable monomer.

The isocyanate group, which exists in the repeating unit derived from the isocyanate group-containing vinyl monomer, reacts with an active hydrogen group of the branch polymer, thereby to bond to the branch polymer.

The term "isocyanate group-containing vinyl monomer" means a compound having a carbon-carbon double-bond and an isocyanate group. The numbers of the carbon-carbon double bond and of the isocyanate group in the isocyanate group-containing vinyl monomer are generally 1. A molecule of the isocyanate group-containing vinyl monomer usually has a carbon-carbon double bond at one terminal of the molecule and an isocyanate group at the other terminal of the molecule.

The isocyanate group-containing vinyl monomer includes, for example, (i) an isocyanate group-containing (meth)acrylate ester, (ii) a vinyl isocyanate represented by the formula:

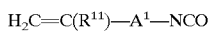

wherein $R^{11}$ is H or a linear, branched or cyclic hydrocarbon group (for example, an alkyl group) having 1 to 20 (for example, 1 to 10) carbon atoms and $A^1$ is a direct bond or a hydrocarbon group having 1 to 20 carbon atoms, and (iii) a reaction product of (iii-1) a compound having two isocyanate groups and (iii-2) a compound having a carbon-carbon double bond- and an active hydrogen.

Examples of the isocyanate group-containing (meth) acrylate ester (i) include:

wherein $R^{12}$ is H or $CH_3$, n is from 0 to 20, and m is from 1 to 20 (for example, 2-isocyanatoethyl (meth)acrylate).

Examples of the vinyl isocyanate (ii) include:

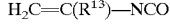

wherein $R^{13}$ is a linear, branched or cyclic hydrocarbon group (for example, an alkyl group or a cycloalkyl group) having 1 to 20 (for example, 1 to 10) carbon atoms,

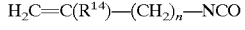

wherein $R^{14}$ is H or a linear, branched or cyclic hydrocarbon group (for example, an alkyl group or a cycloalkyl group) having 1 to 20 (for example, 1 to 10) carbon atoms, and n is from 2 to 20, and

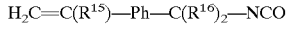

wherein $R^{15}$ is H or $CH_3$, $R^{16}$ is H or $CH_3$, and Ph is a phenylene group.

Examples of the compound having two isocyanate groups (iii-1) include 2,4-tolylene diisocyanate, 2,6-tolylene diisocyanate, diphenylmethane diisocyanate, naphthalene diisocyanate, hexamethylene diisocyanate, xylene diisocyanate, and isophorone diisocyanate.

Examples of the compound having a carbon-carbon double bond and an active hydrogen (iii-2) (hereinafter referred to as a "monomer having an active hydrogen") include:

hydroxyethyl (meth)acrylate,

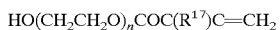

wherein $R^{17}$ is H or $CH_3$ and n is from 2 to 20, and aminoethyl (meth)acrylate.

The reactin between the compound having two isocyanate groups (iii-1) and the monomer having active hydrogen (iii-2) may be conducted in a solvent (especially, an aprotic solvent, for example, an ester solvent) optionally using a catalyst such as dibutyltin dilaurate. The amount of the monomer having active hydrogen (iii-2) in the reaction may be from 1.0 to 2.0 equivalents, and preferably from 1.0 to 1.7 equivalents, based on the compound having two isocyanate groups (iii-1).

The amount of the isocyanate group-containing vinyl monomer is from 1 to 30% by weight, and preferably from 2 to 10% by weight, based on the trunk polymer.

The other copolymerizable monomer constituting the trunk polymer may be any one as far as it is an addition-polymerizable monomer (namely, a compound having a carbon-carbon double bond), and may be either of a fluorine-free monomer and a fluorine-containing monomer. The amount of the fluorine-containing monomer is at most 50% by weight, and preferably at most 10% by weight, based on the trunk polymer. The fluorine-containing monomer may not exist in the trunk polymer.

The fluorine-free monomer includes, for example, a (meth)acrylate ester. The (meth)acrylate ester may be an ester of (meth)acrylic acid and an aliphatic alcohol, for example, a monohydric alcohol or a polyhydric alcohol (for example, a dihydric alcohol).

Examples of the fluorine-free monomer include:
(meth)acrylates such as 2-ethylhexyl (meth)acrylate, cyclohexyl (meth)acrylate, lauryl (meth)acrylate, stearyl (meth)acrylate, hydroxyalkyl (meth)acrylate, tetrahydrofurfuryl (meth)acrylate, polyoxyalkylene (meth)acrylate, 3-chloro-2-hydroxypropyl (meth) acrylate, glycidyl (meth)acrylate, N,N-dimethylaminoethyl (meth)acrylate, N,N-diethylaminoethyl (meth)acrylate, benzyl (meth) acrylate glycidyl methacrylate, hydroxypropyl monomethacrylate, 2-hydroxy-3-phenoxypropyl acrylate, 2-hydroxyethyl acrylate, glycerol monomethacrylate, β-acryloyloxyethyl hydrogen-succinate, β-methacryloyloxyethyl hydrogen-phthalate, 2-acryloyloxyethylhexahydrophthalic acid, 2-acryloyloxy-ethylphthalic acid, 2-acryloyloxyethyl-2-hydroxyethyl-phthalic acid, methacrylic acid hydroxypropyltrimethyl-ammonium chloride, dimethylaminoethyl methacrylate, diethylaminoethyl methacrylate, 2-acryloyloxyethyl acid phosphate, glycosyl ethyl methacrylate, methacrylamide, 2-hydroxy-3-acryloyloxypropyl methacrylate, 2-methacryloyloxyethyl acid phosphate, and hydroxypivalic acid neopentyl glycol diacrylate; styrenes such as styrene and p-isopropylstyrene; (meth)acrylamides such as (meth)acrylamide, diacetone(meth)acrylamide, N-methylol(meth)acrylamide, N-butoxymethylacrylamide, and 2-acrylamide-2-methylpropanesulfonic acid; and vinyl ethers such as vinyl alkyl ether.

Examples thereof further include ethylene, butadiene, vinyl acetate, chloroprene, vinyl halide such as vinyl chloride, vinylidene halide, acrylonitrile, vinyl alkyl ketone, maleic anhydride, N-vinylcarbazole, vinyl pyrrolidone, and (meth)acrylic acid.

The fluorine-free monomer may be a silicon-containing monomer (for example, (meth)acryloyl group-containing alkylsilane, (meth) acryloyl group-containing alkoxysilane, and (meth)acryloyl group-containing polysiloxane).

Examples of the silicon-containing monomer include: (meth)acryloxytrialkylsilane, (meth) acryloxytrialkoxysilane, (meth)acryloxypolysiloxane, (meth)acryloxypropyltrialkylsilane, (meth) acryloxypropyltrialkoxysilane, (meth) acryloxypropylpolysiloxane, allyltrialkylsilane, allyltrialkoxysilane, allylpolysiloxane, vinyltrialkylsilane, vinyltrialkoxysilane, and vinylpolysiloxane.

The (meth)acryloxypropylpolysiloxane may be

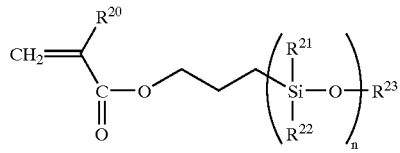

wherein $R^{20}$ is H or $CH_3$, $R^{21}$ is H or $CH_3$, $R^{22}$ is H or $CH_3$, $R^{23}$ is H or $CH_3$, and n is from 1 to 100 (for example, (meth)acryloxypropylpolydimethylsiloxane).

At least two types of the fluorine-free monomers can also be used in combination.

Examples of the fluorine-containing monomer constituting the trunk polymer may be the same as those (for example, fluoroalkyl group-containing (meth)acrylate, fluorinated olefin) of the fluorine-containing monomer constituting the following branch polymer. The fluorine-containing monomer may be, for example, a fluorine-containing methacrylate or acrylate.

The trunk polymer may be a block polymer or a random polymer.

The branch polymer is formed by using a chain transfer agent, a fluoroalkyl group-containing vinyl monomer and, if necessary, the other fluorine-containing monomer and fluorine-free monomer.

The chain transfer agent may be a chain transfer agent having an active hydrogen group at both terminals, for example, an alkylenethiol chain transfer agent having an active hydrogen group or an aryl chain transfer agent having an active hydrogen group. Examples of the active hydrogen group include OH, $NH_2$, $SO_3H$, NHOH, COOH, and SH. The number of carbon atoms of the alkylene group of the alkylenethiol may be from 1 to 20.

Examples of the alkylenethiol chain transfer agent include the followings.

$HS(CH_2)_nOH$ [n is 2, 4, 6 or 11], $HSCH_2COOH$, $HSCH_2CH(CH_3)COOH$, $HSCH_2CH_2SO_3Na$, $HSCH_2CH_2SO_3H$, and

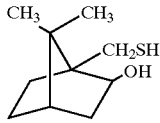

Examples of the allyl chain transfer agent include the followings.

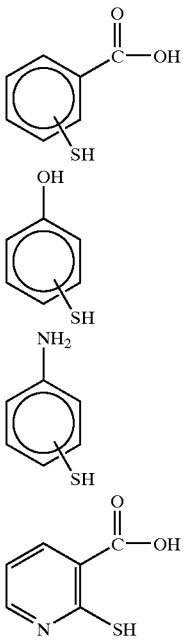

The active hydrogen group of the chain transfer agent reacts with an isocyanate group of the trunk polymer to form a —NH—C(=O)— linkage (an amide linkage). When the active hydrogen group is a OH group, it forms an urethane linkage (—NH—C(=O)—O—). When the active hydrogen group is an NH$_2$ group, it forms an urea linkage (—NH—C(=O)—NH—). The amount of the isocyanate group of the trunk polymer is preferably from 1.0 to 2.0 equivalents, for example, from 1.0 to 1.7 equivalents, based on 1.0 equivalents of the chain transfer agent.

The amount of the chain transfer agent may be from 0.05 to 0.7 mol, preferably from 0.1 to 0.6 mol, based on 1 mol of the branch monomer. The chain transfer agent is bonded at one terminal of the branch polymer obtained by polymerizing the branch monomer. The chain transfer agent can control the length of a chain of the branch polymer.

The fluoroalkyl group-containing vinyl monomer, which constitutes the branch polymer, may be (meth)acrylate having a fluoroalkyl group.

The fluoroalkyl group-containing (meth)acrylate may be represented by the following general formula:

Rf-A$^2$—OCOCR$^{18}$=CH$_2$ wherein Rf is a fluoroalkyl group having 3 to 21 carbon atoms, R$^{18}$ is hydrogen or a methyl group, and A$^2$ is a divalent organic group.

Examples of the fluoroalkyl group-containing (meth)acrylate include:

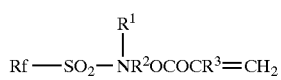

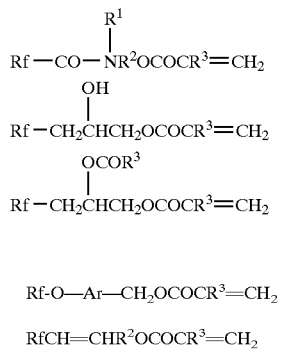

wherein Rf is a fluoroalkyl group having 3 to 21 carbon atoms, R$^1$ is hydrogen or an alkyl group having 1 to 10 carbon atoms, R$^2$ is an alkylene group having 1 to 10 carbon atoms, R$^3$ is hydrogen or a methyl group, Ar is arylene group which optionally has a substituent group, and n is an integer of 1 to 10.

Specific examples of the fluoroalkyl group-containing (meth)acrylate include the followings.

CF$_3$(CF$_2$)$_7$(CH$_2$)OCOCH=CH$_2$,

CF$_3$(CF$_2$)$_6$(CH$_2$)OCOC(CH$_3$)=CH$_2$, (CF$_3$)$_2$CF(CF$_2$)$_6$(CH$_2$)$_2$OCOCH=CH$_2$,

CF$_3$(CF$_2$)$_7$(CH$_2$)$_2$OCOC(CH$_3$)=CH$_2$,

CF$_3$(CF$_2$)$_7$(CH$_2$)$_2$OCOCH=CH$_2$,

CF$_3$(CF$_2$)$_7$SO$_2$N(CH$_3$)(CH$_2$)$_2$OCOCH=CH$_2$,

CF$_3$(CF$_2$)$_7$SO$_2$N(C$_2$H$_5$)(CH$_2$)$_2$OCOC(CH$_3$)=CH$_2$, (CF$_3$)$_2$CF(CF$_2$)$_6$CH$_2$CH(OCOCH$_3$)CH$_2$OCOC(CH$_3$)=CH$_2$, (CF$_3$)$_2$CF(CF$_2$)$_8$CH$_2$CH(OH)CH$_2$OCOCH=CH$_2$,

CF$_3$C$_6$F$_{10}$(CF$_2$)$_2$SO$_2$N(CH$_3$)(CH$_2$)$_2$OCOCH=CH$_2$,

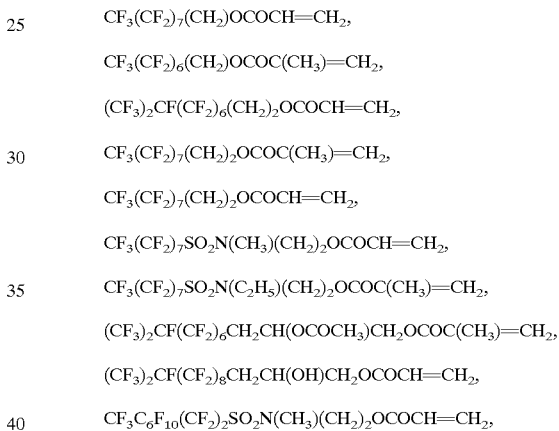

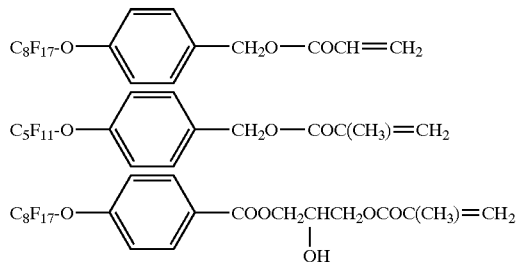

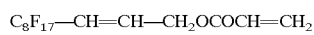

As a matter of course, at least two types of the fluoroalkyl group-containing (meth)acrylates can be used in combination.

In the branch polymer, the other fluorine-containing monomer may be used. The other fluorine-containing monomer includes a fluorinated olefin (having, for example, 3 to 20 carbon atoms), for example,

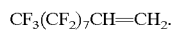

In the branch polymer, a fluorine-free monomer may be used. Examples of the fluorine-free monomer used in the branch polymer include the same fluorine-free monomers as those used in the trunk polymer. The fluorine-free monomer in the branch polymer may be a (meth)acrylate ester, for example, an ester of an aliphatic monohydric alcohol and (meth)acrylic acid.

The amount of the fluorine-free monomer in the branch polymer may be at most 80% by weight, e.g. at most 50% by weight, particularly at most 30% by weight, based on the branch polymer.

The branch polymer may be a block polymer or a random polymer. The polymerization degree of the branch polymer is from 3 to 25 molecules, and preferably from 4 to 20 molecules of the monomer, based on one molecule of the chain transfer agent.

The graft polymer comprises the trunk polymer and the branch polymer. A weight ratio of the trunk polymer to the branch polymer may be from 5:95 to 95:5, preferably from 10:90 to 90:10, particularly from 30:70 to 70:30.

The number average molecular weight (by GPC, converted to polystyrene, in THF) of the graft polymer may be from 5,000 to 200,000, preferably from 5,000 to 100,000.

The graft polymer of the present invention may be prepared by either of:

(A) a method of copolymerizing macromonomer, which is obtained by reacting an isocyanate group-containing vinyl monomer with a branch polymer, and a copolymerizable monomer (a trunk monomer) to form a trunk polymer (a method of polymerizing a trunk monomer in the presence of a branch polymer), and (B) a method of reacting a trunk polymer, which is obtained by copolymerizing an isocyanate group-containing vinyl monomer and a copolymerizable monomer, with a branch polymer (a method of separately polymerizing a branch polymer and a trunk polymer).

The method (A) comprises the steps of:

(A-1) polymerizing a chain transfer agent and a fluoroalkyl group-containing vinyl monomer, which are constituent components of a branch polymer, and, if necessary, the other fluorine-containing monomer and a fluorine-free monomer to give a branch polymer; and (A-2) reacting the resultant branch polymer with an isocyanate group-containing vinyl monomer to give a macromonomer; and (A-3) polymerizing a macromonomer and a copolymerizable monomer constituting a trunk polymer to give a graft polymer.

The method (B) comprises the steps of:

(B-1) polymerizing an isocyanate group-containing vinyl monomer and a copolymerizable monomer, which are constituent components of a trunk polymer, to give an NCO group-containing trunk polymer; and (B-2) grafting a separately synthesized branch polymer onto the resultant trunk polymer to give a graft polymer.

The polymerization step (A-1) of the branch polymer and the polymerization steps (A-3) and (B-1) of the trunk polymer may be conducted in a solvent at a temperature of 70 to 80° C. using a polymerization initiator. The polymerization time is generally from 2 to 12 hours.

As the polymerization initiator, for example, azobisisobutyronitrile, benzoyl peroxide, di-tert-butyl peroxide, lauryl peroxide, cumene hydroperoxide, tert-butyl peroxide pivalate, and diisopropylperoxy dicarbonate are used. The amount of the polymerization initiator is preferably from 1 to 10 parts by weight based on 100 parts by weight of the monomer.

The polymerization solvent may be a polar solvent, a hydrocarbon solvent, or a mixture of these solvents. When the isocyanate group exists in the reaction system (namely, in the steps (A-2), (B-1) and (B-2)), a protic solvent having an active hydrogen group such as alcohol solvent can not be used.

The polar solvent is a solvent having a polar group in a molecule. Examples of the polar group include a hydroxyl group, a carboxyl group, an ester group, an acyl group, and an ether oxygen group. Examples of the polar solvent include an alcohol solvent, a glycol solvent, an ester solvent, and a ketone solvent.

The hydrocarbon solvent may be a solvent which is composed only of carbon and hydrogen. The hydrocarbon solvent may be an aliphatic hydrocarbon. Examples of the hydrocarbon solvent include n-heptane, n-hexane, n-octane, cyclohexane, methylcyclohexane, cyclopentane, methylcyclopentane, methylpentane, 2-ethylpentane, isoparaffin hydrocarbon, liquid parrafin, decane, undecance, dodecane, mineral spirit, and mineral turpentine. In some case, an aromatic solvent may be used.

Examples of the alcohol solvent include butyl alcohol and isopropyl alcohol. Examples of the glycol solvent include propylene glycol monomethyl ether, propylene glycol monoethyl ether, dipropylene glycolmonomethyl ether, dipropylene glycol monoethyl ether, and acetate thereof. Examples of the ester solvent include a monobasic acid ester such as methyl acetate, ethyl acetate, and butyl acetate; and a dibasic acid ester such as diethyl succinate, diethyl adipate, dibutyl phthalate, and dioctyl phthalate. Examples of the ketone solvent include methyl isobutyl ketone (MIBK), methyl ethyl ketone, and acetone.

A mixture of the hydrocarbon solvent and the polar solvent may also be used. The weight ratio of the hydrocarbon solvent to the polar solvent may be from 100:0 to 0:100, for example 5:95 to 95:5.

The reaction steps (A-2) and (B-2) of reacting the active hydrogen group of the chain transfer agent constituting the branch polymer with the isocyanate group contained in the monomer constituting the trunk polymer may be conducted in a solvent at a temperature of 30° C. to 65° C. The reaction time is generally from 2 hours to 24 hours.

Although the solvent may be the polymerization solvent described above, a protic solvent having an active hydrogen group such as alcohol solvent can not be used.

An organic solvent solution of the graft polymer is a solvent-based water- and oil-repellent composition.

The water- and oil-repellent composition of the present invention may contain other water- and oil-repellents and additives, for example, softening agents, antistatic agents, cross-linking agents and crease-proofing agents, if necessary.

A substrate to be treated with the water- and oil-repellent composition of the present invention includes various substances. Examples of the substrate to be treated include textiles, glass, papers, woods, hides, asbestos, bricks, cements, metals and oxides, ceramics, plastics, coated surfaces, and plasters. Examples of the textiles include animal- and vegetable-origin natural fibers such as cotton, hemp, wool, and silk; synthetic fibers such as polyamide, polyester, polyvinyl alcohol, polyacrylonitrile, polyvinyl chloride, and polypropylene; semisynthetic fibers such as rayon and acetate, etc.; and a mixture of these fibers. The water- and oil-repellent composition of the present invention is applied to the substrate by a method of applying the composition onto the surface of the substrate to be treated using a known process such as dip coating, and then drying the composition.

The water- and oil-repellent composition of the present invention can also be used as an aerosol by adding propellants. Examples of preferred propellant include fluoroalkane or chlorofluoroalkane having 1 or 2 carbon atoms, LPG gas, dimethyl ether, nitrogen gas, and carbon dioxide gas. Typical examples of the fluoroalkane or chlorofluoroalkane having 1 or 2 carbon atoms include dichlorodifluoromethane, trichlorotrifluoroethane, chlorodifluoromethane, chlorodifluoroethane, dichlorotrifluoroethane, tetrafluoroethane, and a mixture of at least two types of them. The amount of the propellant is preferably 0.05 to 2 times as much as the total weight of the surface treating agent composition containing the solvent.

A container having a mechanism for spraying a liquid in the container, for example, an aerosol container or a spray container is filled with the aerosol.

PREFERRED EMBODIMENTS OF THE INVENTION

The present invention will be illustrated by the following Examples which do not limit the present invention.

Characteristics were determined as follows.

Water- and Oil-repellency

A polymer solution is diluted with a mineral spirit so that a solid content of the solution is 0.8% by weight, and then sprayed over a cloth using a hand spray so that the cloth is sufficiently wetted. As the cloth, a polyester cloth, a polyester/cotton mixed spun cloth and a cotton cloth are used. After drying at room temperature for 10 hours, the water repellency and oil repellency are evaluated in the following procedures.

The water repellency is expressed by the water repellency No. (cf. the following Table 1) determined by the spray method according to JIS (Japanese Industrial Standard)-L-1092 (1998).

The oil repellency is determined by dropping several drops of a test solution shown in Table 2 on the surface of a test cloth and then observing the penetration state of the drops after 30 seconds (AATCCTM118).

TABLE 1

| Water repellency No. | State |
| --- | --- |
| 5 | No wet on the surface |
| 4 | Slight wet on the surface |
| 3 | Partial wet on the surface |
| 2 | Wet on the surface |
| 1 | Wet over the whole surface |

TABLE 2

| Oil repellency | Test solution | Surface tension (dyne/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 by weight) | 29.6 |
| 1 | Nujol | 31.2 |
| 0 | Inferior to 1 | — |

Product Stability

After adjusting the concentration of the polymer solution to 15% by weight using a mineral spirit, the polymer solution is stored at −5° C. for one month. It is evaluated whether or not solidification or deposition occurs.

○: Homogeneous liquid is maintained.

x: Solidification or deposition occurs.

Dilution Stability

The polymer solution is diluted with a solvent (n-decane) so that the solid content of the solution is 0.8% by weight, and then stored at −5° C. for one month. It is evaluated whether or not solidification or deposition occurs.

○: Homogeneous and transparent liquid is maintained.

Δ: Some turbidity occurs, but homogeneous liquid is maintained for practical use.

x: Deposition or solidification occurs.

Synthesis Example 1
(Synthesis of Isocyanate Group-containing Vinyl Monomer)

In a 500 ml three-necked flask equipped with a dropping funnel, 100 g of 2,4-tolylene diisocyanate, 100 g of ethyl acetate and 0.1 g dibutyltin dilaurate were charged. While shaking at 50 to 55° C., 90 g of hydroxyethyl methacrylate and 90 g of ethyl acetate were added dropwise through the dropping funnel over 15 minutes and the mixture was reacted for 8 hours to give an isocyanate group-containing vinyl monomer (a) shown below:

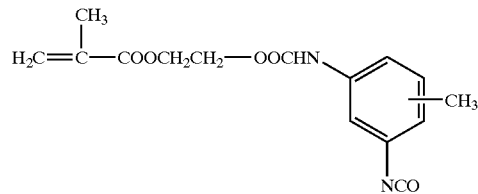

EXAMPLE 1

In a 1,000 ml glass polymerization sample, the following components were charged and reacted in a nitrogen atmosphere at 75° C. for 8 hours while shaking to give a branch polymer.

| | |
| --- | --- |
| Mercaptoethanol | 3 g |
| $CF_3CF_2(C_2F_4)_nC_2H_4OCOCH=CH_2$ (FA) [n = 3.5 in average] | 95 g |
| Stearyl methacrylate(StMA) | 5 g |
| Azoisobutyronitrile | 0.17 g |
| Ethyl acetate | 120 g |

After the completion of the reaction, a gas chromatography analysis revealed that 100% of monomers were consumed. A NMR analysis revealed that a composition ratio (molar ratio) of the respective components in the polymer, namely, a ratio of mercaptoethanol:FA:StMA was 1.0:4.8:0.8.

After reducing the temperature to 55 to 60° C., 9 g of 2-isocyanatoethyl methacrylate (2-EHMA) and 0.1 g of dibutyltin dilaurate were charged in an air atmosphere and the reaction was conducted at 55 to 60° C. for 8 hours while shaking to give a macromonomer. After the completion of the reaction, an absorption peak of a NCO group of an IR spectrum nearly disappeared.

To the macromonomer, the following components were added and the reaction was conducted in a nitrogen atmosphere at 75° C. for 8 hours while shaking to give a graft polymer.

| | |
|---|---|
| 2-Ethylhexyl methacrylate (2EHMA) | 100 g |
| Maleic anhydride (MAN) | 10 g |
| Ethyl acetate | 515 g |
| Tert-butylperoxy pivalate (Perbutyl PV, manufactured by NOF Corp.) | 9 g |

After the completion of the reaction, a gas chromatography analysis revealed that 100% of monomers were consumed. A GPC analysis revealed that a number average molecular weight of the resultant polymer was 8,000.

The water- and oil-repellency, the product stability and the dilution stability of the resultant polymer solution were determined. The results are shown in Table 5.

EXAMPLE 2

In the same manner as in Example 1, except that 38 g of the solution (50% by weight) of isocyanate group-containing vinyl monomer (a) prepared in Synthesis Example 1 was used in place of 2-isocyanatoethyl methacrylate, the synthesis was conducted.

In the preparation of each of the branch polymer and the graft polymer, 100% of monomers were consumed. After the completion of the reaction for forming a macromonomer, an NCO absorption of an IR spectrum nearly disappeared. A GPC analysis revealed that a number average molecular weight of the resultant polymer was 8,500.

The water- and oil-repellency, the product stability and the dilution stability of the resultant polymer solution were determined. The results are shown in Table 5.

EXAMPLES 3 to 6

The same procedure as in Example 1 was repeated, except that the monomers shown in Table 3 were used.

In the preparation of each of the branch polymer and the graft polymer, 100% of monomers were consumed. After the completion of the reaction for forming a macromonomer, an NCO absorption of an IR spectrum nearly disappeared. A GPC analysis revealed that a number average molecular weight of the resultant polymers was 9,300 in Example 3, 9,000 in Example 4, 8,600 in Example 5, and 8,000 in Example 6.

The water- and oil-repellency, the product stability and the dilution stability of the resultant polymer solutions were determined. The results are shown in Table 5.

Comparative Example 1

1.0 equivalent of 2-isocyanatoethyl methacrylate and 0.7 equivalents of mercaptoethanol were reacted in ethyl acetate at 50° C. for 12 hours in the presence of 0.1 g of dibutyltin dilaurate.

To 5.5 g of the resultant reaction product (a reaction product of an isocyanate group-containing vinyl monomer and mercaptoethanol), the following components were added and the mixture was reacted in a nitrogen atmosphere at 75° C. for 8 hours while shaking to give a polymer.

| | |
|---|---|
| $CF_3CF_2(C_2F_4)_nC_2H_4OCOCH=CH_2$ (FA) [n = 3.5 in average] | 42.7 g |
| Stearyl methacrylate (StMA) | 2.3 g |
| 2-Ethylhexyl methacrylate (2EHMA) | 45.0 g |
| Maleic anhydride (MAN) | 4.5 g |
| Ethyl acetate | 515 g |
| Tert-butylperoxy pivalate (Perbutyl PV, manufactured by NOF Corp.) | 9 g |

The resultant polymer was not a graft polymer. A GPC analysis revealed that a number average molecular weight of the resultant polymer was 15,000.

The water- and oil-repellency, the product stability and the dilution stability of the resultant polymer solution were determined. The results are shown in Table 5.

Comparative Example 2

The same procedure as in Comparative Example 1 was repeated, except for using, as a reaction product of the isocyanate group-containing vinyl monomer and mercaptoethanol, a reaction product obtained by reacting a reaction mixture of 1.0 equivalent of the isocyanate group-containing vinyl monomer (a) of Synthesis Example 1 with 0.7 equivalents of mercaptoethanol in ethyl acetate at 50° C. for 12 hours and using the monomers shown in Table 4.

The resultant polymer was not a graft polymer. A GPC analysis revealed that a number average molecular weight of the resultant polymer was 14,000.

The water- and oil-repellency, the product stability and the dilution stability of the resultant polymer solutions were determined. The results are shown in Table 5.

Comparative Examples 3 to 6

The same procedure as in Comparative Example 1 was repeated, except that the monomers shown in Table 4 were used.

The polymers obtained in Comparative Examples 3 to 6 were not a graft polymer. A GPC analysis revealed that a number average molecular weight of the resultant polymers was 18,000 in Comparative Example 3, 16,000 in Comparative Example 4, 19,500 in Comparative Example 5, and 16,000 in Comparative Example 6.

The water- and oil-repellency, the product stability and the dilution stability of the resultant polymer solutions were determined. The results are shown in Table 5.

TABLE 3

| | Amount (g) of monomer | | | | | | | | |
|---|---|---|---|---|---|---|---|---|---|
| | Branch polymer | | | | | | Trunk polymer | | |
| | Macromonomer | | | | | | | | |
| | Mercapto-ethanol | FA | StMA | 2-EHMA | THFMA | 2-Isocyanato-ethyl methacrylate | Isocyanate group-containing vinyl monomer (a) | 2-EHMA | MAN |
| Example 1 | 3 | 95 | 5 | — | — | 9 | — | 100 | 10 |
| Example 2 | 3 | 95 | 5 | — | — | — | 38 | 100 | 10 |
| Example 3 | 3 | 95 | 5 | — | — | 9 | — | 110 | — |
| Example 4 | 3 | 90 | 10 | — | — | 9 | — | 100 | 10 |
| Example 5 | 3 | 90 | — | 10 | — | 9 | — | 100 | 10 |
| Example 6 | 3 | 90 | — | — | 10 | 9 | — | 100 | 10 |

(Note)
FA: $CF_3CF_2(C_2F_4)_nC_2H_4OCOCH=CH_2$, n = 3.5 in average
StMA: stearyl methacrylate
2-EHMA: 2-ethylhexyl methacrylate
THFMA: tetrahydrofurfuryl methacrylate
MAN: maleic anhydride
Isocyanate group-containing vinyl monomer (a): 50 wt % solution of isocyanate group-containing vinyl monomer (a) of Synthesis Example 1

TABLE 4

| | Amount (g) of monomer | | | | | |
|---|---|---|---|---|---|---|
| | FA | StMA | 2-EHMA | THFMA | MAN | Reaction product of isocyanate group-containing vinyl monomer and mercaptoethanol |
| Comp. Example 1 | 42.7 | 2.3 | 45.0 | — | 4.5 | 5.5 |
| Comp. Example 2 | 40.9 | 2.2 | 43.2 | — | 4.3 | 9.4 |
| Comp. Example 3 | 42.7 | 2.3 | 49.5 | — | — | 5.5 |
| Comp. Example 4 | 40.5 | 4.5 | 45.0 | — | 4.5 | 5.5 |
| Comp. Example 5 | 40.5 | — | 49.5 | — | 4.5 | 5.5 |
| Comp. Example 6 | 40.5 | — | 45.0 | 4.5 | 4.5 | 5.5 |

(Note)
FA: $CF_3CF_2(C_2F_4)_nC_2H_4OCOCH=CH_2$, n = 3.5 in average
StMA: stearyl methacrylate
2-EHMA: 2-ethylhexyl methacrylate
THFMA: terahydrofurfuryl methacrylate
MAN: maleic anhydride

TABLE 5

| | Water-repellency | | | Oil-repellency | | | Product stability | Dilution stability |
|---|---|---|---|---|---|---|---|---|
| | Polyester | Polyester/cotton | Cotton | Polyester | Polyester/cotton | Cotton | | |
| Example 1 | 5 | 5 | 5 | 5 | 6 | 6 | ○ | ○ |
| Example 2 | 5 | 5 | 4 | 4 | 6 | 6 | ○ | ○ |
| Example 3 | 5 | 3 | 3 | 2 | 3 | 3 | ○ | ○ |
| Example 4 | 5 | 5 | 5 | 5 | 6 | 6 | ○ | ○ |
| Example 5 | 5 | 5 | 5 | 5 | 6 | 5 | ○ | ○ |
| Example 6 | 5 | 5 | 5 | 5 | 5 | 3 | ○ | ○ |
| Comp. Example 1 | 2 | 2 | 1 | 1 | 1 | 0 | X | X |
| Comp. Example 2 | 1 | 1 | 1 | 0 | 0 | 0 | Δ | X |
| Comp. Example 3 | 2 | 2 | 1 | 0 | 0 | 0 | ○ | X |
| Comp. Example 4 | 2 | 2 | 1 | 1 | 1 | 0 | X | X |
| Comp. Example 5 | 2 | 1 | 1 | 2 | 1 | 0 | X | X |
| Comp. Example 6 | 2 | 1 | 1 | 2 | 2 | 2 | ○ | X |

Effect of the Invention

The graft polymer of the present invention can exhibit both the function of the fluorine-containing component and that of the hydrocarbon component. For example, it is possible to reconcile the softness of treated articles (especially, textiles) with the repellency effect of the water- and oil-repellency and to reconcile the solubility of the water- and oil-repellent with the repellency effect.

Furthermore, high water- and oil-repellency can be imparted even when a small amount of the water- and oil-repellent is used. Good performances can be exhibited even if the content of the fluoroalkyl group-containing vinyl monomer in the graft polymer is small.

What is claimed is:

1. A solvent-based water- and oil-repellent composition comprising a graft copolymer wherein a branch polymer having a fluoroalkyl group is bonded to a trunk polymer through a linkage having a —C(=O)NH— group, and the linkage having a —C(=O)NH— group is formed by reacting an active hydrogen group of a chain transfer agent constituting the branch polymer with an isocyanate group contained in a monomer constituting the trunk polymer.

2. A process for preparing a graft copolymer wherein a branch polymer having a fluoroalkyl group is bonded to a trunk polymer through a linkage having a —C(=O)NH— group, and the linkage having a —C(=O)NH— group is formed by reacting an active hydrogen group of a chain transfer agent constituting the branch polymer with an isocyanate group contained in a monomer constituting the trunk polymer, which process comprises copolymerizing a macromonomer, which is obtained by reacting an isocyanate group-containing vinyl monomer with a branch polymer, and a copolymerizable monomer to form a trunk polymer.

3. A process for preparing a graft copolymer wherein a branch polymer having a fluoroalkyl group is bonded to a trunk polymer through a linkage having a —C(=O)NH— group, and the linkage having a —C(=O)NH— group is formed by reacting an active hydrogen group of a chain transfer agent constituting the branch polymer with an isocyanate group contained in a monomer constituting the trunk polymer, which process comprises reacting a trunk polymer, which is obtained by copolymerizing an isocyanate group-containing vinyl monomer and a coplymerizable monomer, with a branch polymer.

4. The solvent-based water- and oil-repellent composition as claimed in claim 1, wherein the trunk polymer comprises a fluorine-free hydrocarbon polymer as a main component.

5. The solvent-based water- and oil-repellent composition as claimed in claim 1, wherein the trunk polymer has a repeating unit derived from an isocyanate group-containing vinyl monomer and a repeating unit derived from another copolymerizable monomer.

6. The solvent-base water- and oil-repellent composition as claimed in claim 1, wherein the chain transfer agent comprises an active hydrogen group selected from the group consisting of OH, $NH_2$, $SO_3H$, NHOH, COOH and SH.

* * * * *